United States Patent [19]

Sealey

[11] 4,155,522
[45] May 22, 1979

[54] OVERLOAD RELEASE APPARATUS FOR AIRCRAFT LANDING GEAR OR THE LIKE

[75] Inventor: Francis Sealey, Bellevue, Wash.

[73] Assignee: The Boeing Company, Seattle, Wash.

[21] Appl. No.: 815,506

[22] Filed: Jul. 14, 1977

[51] Int. Cl.² .................................................. B64C 25/10
[52] U.S. Cl. .................................................. 244/102 R
[58] Field of Search ............ 244/102 R, 104 R, 100 R, 244/108

[56] References Cited

U.S. PATENT DOCUMENTS

| 1,641,700 | 9/1927 | Sperry | 244/100 R |
|---|---|---|---|
| 1,778,477 | 10/1930 | Wood | 74/584 X |
| 2,391,275 | 12/1945 | Shaw | 244/100 R X |
| 2,633,037 | 3/1953 | Westbury | 74/584 |
| 2,641,423 | 6/1953 | Harriman et al. | 244/100 R |
| 2,961,204 | 11/1960 | Rayfield et al. | 244/138 R |
| 2,997,261 | 8/1961 | Westcott | 244/103 R |
| 3,066,888 | 12/1962 | Doak | 244/100 R X |
| 3,143,321 | 8/1964 | McGehee et al. | 244/100 R |
| 3,185,413 | 5/1965 | Walker | 244/63 |
| 3,304,031 | 2/1967 | Mulquin | 244/63 |
| 3,602,065 | 8/1971 | Ratcliff | 403/2 X |
| 3,716,208 | 2/1973 | Fagan et al. | 244/108 |
| 3,964,578 | 6/1976 | Campbell et al. | 188/1 C |
| 3,967,906 | 7/1976 | Strizki | 403/2 |

FOREIGN PATENT DOCUMENTS

| 1213253 | 3/1966 | Fed. Rep. of Germany | 244/100 R |
|---|---|---|---|
| 2004453 | 8/1970 | Fed. Rep. of Germany | 244/102 R |

Primary Examiner—Barry L. Kelmachter

[57] ABSTRACT

A landing gear assembly mounted to a trunnion for movement about a transverse horizontal axis to a stowed position. The trunnion is mounted to an intermediate member which is in turn mounted to the aircraft structure for rotation about an axis skewed with respect to the trunnion axis. The intermediate member is releasably held to the aircraft structure by a fuse pin which gives way under conditions of excessive loading on the landing gear assembly, so that the landing gear assembly is able to rotate about its skewed axis to an out-of-the-way location clear of the cargo compartment.

23 Claims, 7 Drawing Figures

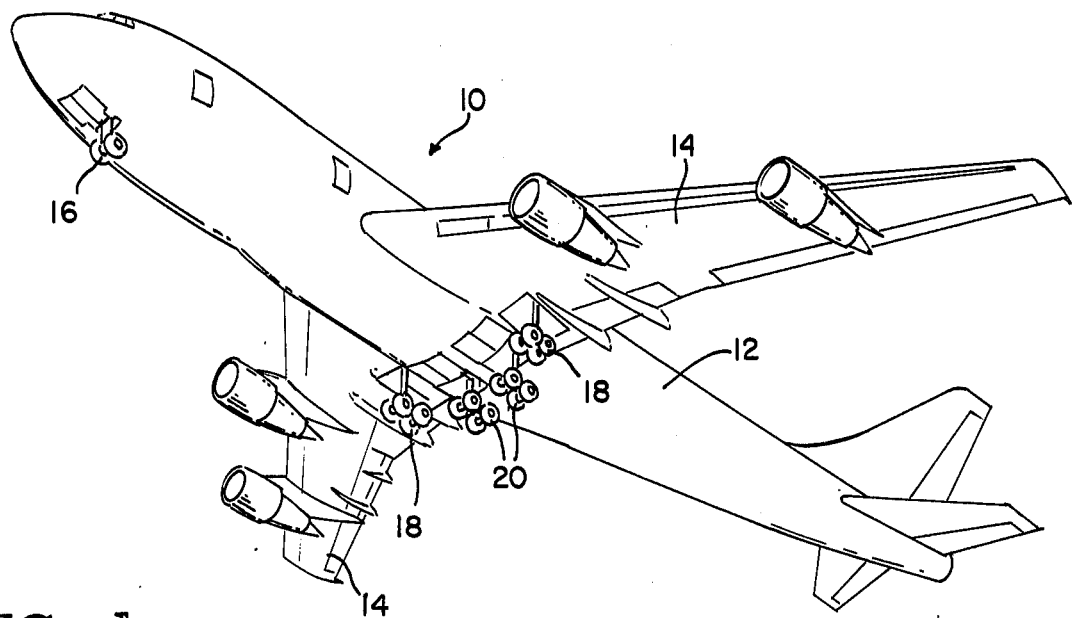
FIG. 1
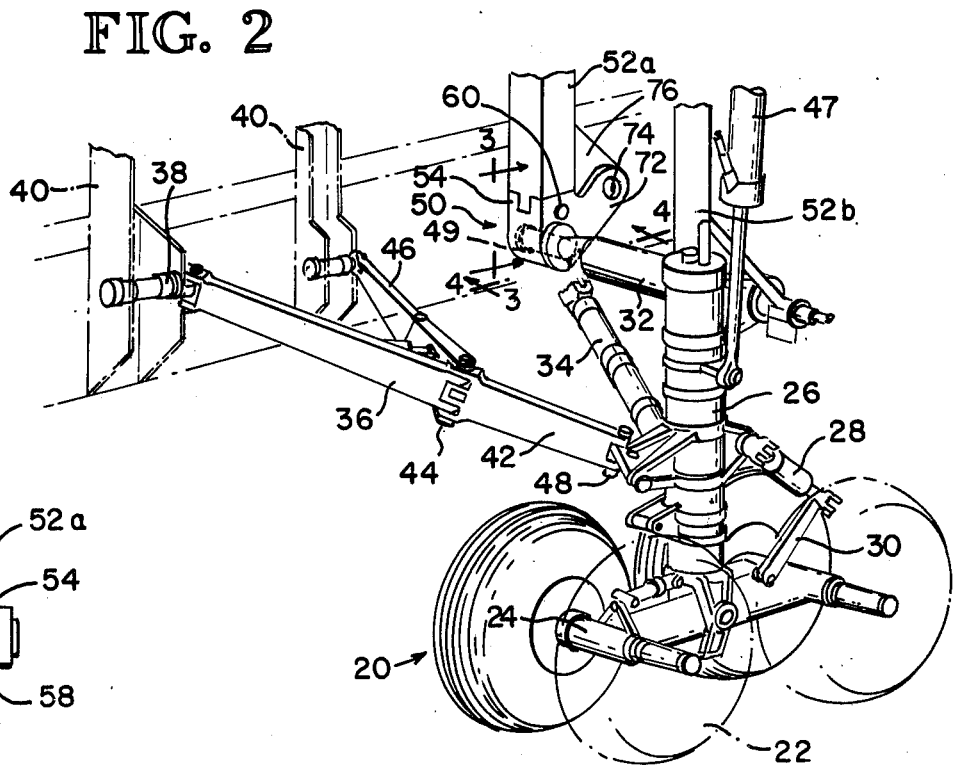
FIG. 2
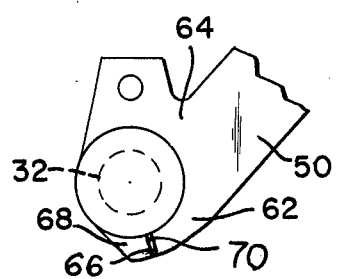
FIG. 3
FIG. 4

OVERLOAD RELEASE APPARATUS FOR AIRCRAFT LANDING GEAR OR THE LIKE

BACKGROUND OF THE INVENTION

A. Field of the Invention

The present invention relates generally to overload release apparatus, and more particularly to such an apparatus as applied to a landing gear assembly of an aircraft.

B. Brief Description of the Prior Art

In the aircraft industry, where weight of the aircraft components is such a highly critical factor, it is common to design components to withstand applied loads of a predetermined level plus a certain overload factor. To allow for those exceptional situations where unusually large loading occurs, various types of overload release apparatus are employed to permit certain components to yield in a manner to minimize danger to the occupants of the aircraft and minimize damage to the aircraft. One practice is to use fuse pins or the like which simply give way at a predetermined level of loading. Another is to employ yielding members which will permanently deform under excessive loading to absorb energy and thus cushion the impact.

With regard particularly to aircraft landing gear, to absorb the impact which the landing gear normally encounters in making a landing, generally, there is incorporated in the landing gear energy absorbing devices, such as shock struts. However, under conditions of excessive loading on the landing gear (which could occur, for example, when the aircraft is descending too rapidly or where the landing gear encounters some obstruction on the landing surface), it can be expected that the shock strut or other impact absorbing member would be stressed beyond its design limits so that it and possibly other components of the aircraft would be damaged. Thus, there have been developed in the prior art various devices which employ the above-mentioned practice of using components which will deform permanently under conditions of excessive loading to prevent overstressing of certain components of the aircraft and diminish the impact which is ultimately transmitted to the aircraft. Typical of such devices are the following.

In the Harriman et al patent, U.S. Pat. No. 2,641,423, there is shown a landing gear for a helicopter. The gear comprises elongate tubular members which deform under bending moments to absorb the shock of "hard landings."

The Rayfield et al patent, U.S. Pat. No. 2,961,204, shows a landing device adaptable for space capsules or the like. There are a plurality of telescoping struts, with "cutters" being positioned in engagement with the interior members of the telescoping struts. Upon impact of landing, as the struts move inwardly in telescoping fashion, the cutters cut grooves in the strut member to absorb the impact.

The Westcott, Jr. patent, U.S. Pat. No. 2,997,261, shows a tension rod extending between two pivotally mounted components of a landing gear. Under excessive loading, this tension rod is stretched beyond its elastic limit to absorb the impact.

The Doak patent, U.S. Pat. No. 3,066,888, shows an aircraft having two laterally spaced engines to provide vertical thrust. To prevent damage to the engines in the event of an improper landing, energy absorbing members are mounted in the aft faring of each engine.

The McGehee et al patent, U.S. Pat. No. 3,143,321, shows a shock absorbing strut for a spacecraft and the like. This strut comprises a tubular member mounted to a flared base. Upon impact loading, the tubular member fractures into fragments as it continues to move downwardly over the flared base.

The Fagan et al patent, U.S. Pat. No. 3,716,208, shows a helicopter landing gear where there is a liquid spring mechanism to absorb shocks. This is mounted to a laterally extending plastically deformable member which bends upwardly upon impact to absorb the shock.

Also representative of the prior art is German Pat. No. 1,213,253, issued Mar. 24, 1966.

In addition to the prior art noted above which relates specifically to landing devices for aircraft, the following patents are noted as background information relating to various arrangements of overload release devices.

The Wood patent, U.S. Pat. No. 1,778,477, shows a particular arrangement of a shear pin mounted to a shaft.

The Shaw patent, U.S. Pat. No. 2,391,275, shows a yield link which has a tubular member that collapses under axially loading. One of the suggested uses for such a strut is for the undercarriage of airplanes.

The Westbury patent, U.S. Pat. No. 2,633,037, shows a configuration for a collapsible strut which telescopes under axial loading.

The Walker patent, U.S. Pat. No. 3,185,413, shows a particular device for locating a shear pin used in holding an aircraft prior to launch.

The Mulquin patent, U.S. Pat. No. 3,304,031, also shows a catapult related device for an aircraft, and specifically shows a tension element which fractures under tension loading above a certain level.

The Ratcliff patent, U.S. Pat. No. 3,602,065, shows an arrangement where there is a shear pin on a cranking lever for a cable-type hoist. When the shear pin gives way, it is necessary to replace the pin before the lever again becomes operable, this being a safety feature for this particular type of apparatus.

The Campbell, et al patent, U.S. Pat. No. 3,964,578, shows an automobile related device to absorb shocks in a crash situation. It relates to a particular configuration of a shock-absorbing plate which has slots which permit the plate to deform from a planar configuration upon impact.

The Strizki patent, U.S. Pat. No. 3,967,906, simply shows a mounting for a sign post whereby the upper support member is releasably connected to a lower support by break-away coupling members which are adequate to withstand wind loads and the like, but which will give way upon crash impact, such as would occur when an automobile runs into the sign.

As a matter of general interest, the Sperry patent, U.S. Pat. No. 1,641,700, is noted to show a detachable landing gear in an aircraft. The landing gear is released by pulling a lever which in turn releases a retaining latch.

SUMMARY OF THE INVENTION

The present invention relates to the deployment under overload conditions of a movable member, such as a landing gear component, mounted to a base structure, such as an aircraft fuselage, and having a normal operating movement on a first axis between a first and second position. The present invention is directed to the proper deployment of the movable member to a third position under condition of excessive loading which tends to move the member beyond its second position.

The present invention utilizes an intermediate mounting member to which the movable member is mounted for movement on the first axis between its first and second positions. Stop means are operatively positioned between the intermediate mounting member and the movable member to limit movement of the movable member relative to the intermediate member beyond the second position. The intermediate member is in turn mounted to the base structure for movement on a second axis offset from the first axis, and there is a yielding connecting member interconnecting the intermediate member and the base member. This yielding member is arranged to resist movement of the intermediate member on the second axis with a resisting force less than a force which would be exerted thereon as a result of excessive loading on a movable member. The result of this arrangement is that under conditions of excessive loading on the movable member, the stop means resists further movement of the movable member on the first axis, so that the yielding member gives way, and the movable member and the intermediate member then move together on the second axis to the third overload position.

In the preferred embodiment, the movable member is mounted to the intermediate member for rotation about the first axis, and the intermediate mounting member has a pivot connection to the base structure for rotation about the second axis, with the pivot connection being spaced from the location of the yielding member which interconnects the intermediate member to the base structure. Thus, movement under the overload condition is rotational movement about the second axis at the pivot connection.

More specifically, in this preferred embodiment, the movable member has first and second ends, with the first end being connected to the intermediate member for rotation as indicated in the above paragraph. The second end is mounted to the base structure for rotation about both said first and said second axes, so that the second axis is "skewed" with respect to the first axis. This mounting of the second end is conveniently accomplished by use of a ball joint type connection, mounted for rotation about a point generally coinciding with a point where the first and second axes of rotation intersect.

It is believed that the present invention has particular significance with regard to its application to aircraft landing gear. In this form, the movable member is the wheel or wheels along with certain associated components, which are mounted about a rotational axis for deployment between an upper stowed position and a lower down position for landing. The preferred mounting is a generally transversely aligned trunnion, one end of which is rotatably mounted to the base structure, in a manner to be pivotable about two axes, this being accomplished conveniently by a ball joint connection. The other end of the trunnion is mounted to the intermediate mounting member which is connected to the aircraft structure at two locations. First, there is a releasable connection (i.e., fuse pin connection) which gives way when loaded above a predetermined level. There is a second pivot connection which permits rotation of the second member about the second axis which is skewed with respect to the trunnion axis and intersects the trunnion axis at the general location of the mounting connection of the opposite end of the trunnion. The intermediate member is provided with a stop to prevent further rotation of the wheel and associated components about the trunnion axis.

When the aircraft landing gear is in its down position, and it is subjected to excessive loading, such as encountering some unusual obstacle on the runway, it is expected that the drag strut or other component which restrains the aircraft wheel or wheels from further rearward movement willl give way. Further rearward rotation of the wheel or wheels about the trunnion axis is prevented by the stop member, so that the force exerted on the wheels is transmitted to the fuse pin connection of the intermediate member to cause it to give way. Thereafter, further rearward rotation of the aircraft wheels continues about the skewed overload release axis so that the aircraft wheels and associated components rotate not only upwardly and rearwardly, but in a sidewise direction laterally of the aircraft so as to be clear of the aircraft cargo compartment.

BRIEF DESCRIPTION OF THE DRAWINGS

FIG. 1 is a perspective view of an aircraft having landing gear incorporating the teachings of the present invention;

FIG. 2 is a perspective view of the left inboard landing gear assembly shown in FIG. 1;

FIG. 3 is a view, taken at 3—3 of FIG. 2 and drawn to an enlarged scale, showing a fuse pin connection of an intermediate mounting member;

FIG. 4 is a view taken along line 4—4 of FIG. 2, drawn to an enlarged scale, showing a stop member for the trunion of the landing gear;

DESCRIPTION OF THE PREFERRED EMBODIMENT

Figure 5:
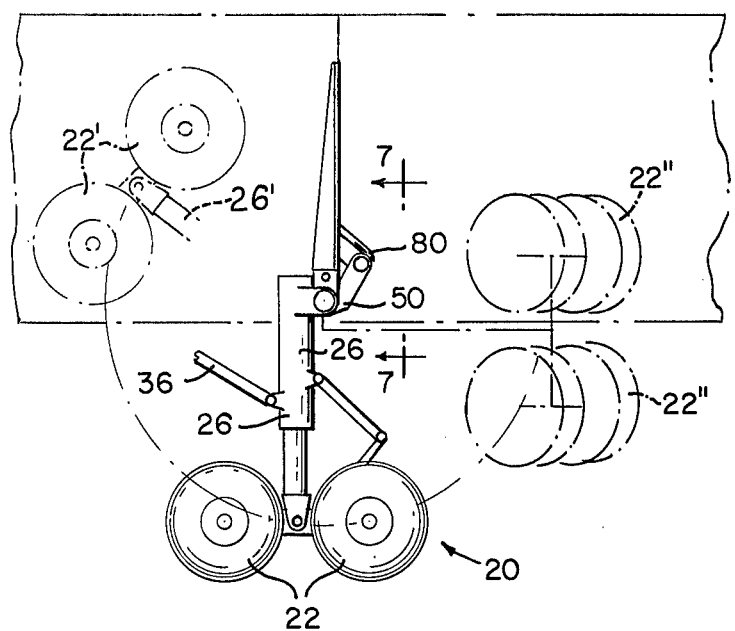
FIG. 5 is a side-elevational view of the landing gear shown in FIG. 2, with the assembly being shown in broken lines in a forward upper stowed condition, and also in an overload release condition where the assembly has moved not only in an upward and rearward direction, but also laterally in an outward direction.

The present invention is particularly adapted for use in landing gear of an aircraft such as the Boeing 747. Accordingly, the preferred embodiment disclosed herein shows the present invention incorporated in a landing gear assembly used in this type of aircraft, this being done with the understanding that the broader aspects of the present invention are not to be limited to this particular apparatus. In describing the present invention, it is believed its novel features will be more clearly disclosed by presenting a general description of the main components of a prior art landing gear, such as that which exists in a 747 airplane, followed by a detailed description of the components of the present invention incorporated in this landing gear.

In FIG. 1, there is shown an aircraft 10 having a fuselage 12 and wings 14. The landing gear of the aircraft 10 comprises a nose landing gear assembly 16, and four main landing gear assemblies, namely, two outside assemblies 18 mounted at the root ends of the two wings 14 and two inner assemblies 20 mounted to the bottom side of the fuselage 12. The present invention is incorporated in the two inner landing gear assemblies 20. Since the two interior landing gear assemblies 20 are substantially identical (except that the components are reversed for right and left side mounting), only the left landing gear assembly 20 will be described in detail herein.

With reference to FIG. 2, there will now be described those components in the left landing gear 20 which existed in the art prior to the present invention. There is a set of tires 22 mounted to axles 24 which in turn are supported from a shock strut 26 (i.e., oleo strut), from which two steering actuators 28 and a torque link 30 are mounted. The shock strut 26 is in turn connected to a trunnion 32 which is mounted about a transverse horizontal axis, and there is a side brace 34 also connecting the shock strut 26 to the trunnion 32. (In FIG. 2, the end portion of the side brace 34 connecting to the trunnion 32 is broken away for purposes of illustration.) Extending forwardly from a lower portion of the shock strut 26 is a folding drag brace 36 which connects by its forward end at 38 to the main structure 40 of the fuselage 12, and by its rear end 42 to a lower portion of the shock strut 26. From a middle flexure point 44 of the drag brace 36, there is a connection to the fuselage structure 40 by means of a "jury strut" 46.

To move the landing gear to its stowed position, there is provided a retraction actuator 47 connected to the shock strut 26. When the actuator 47 is retracted, it lifts the wheels 22 (and the other components connected thereto which are mounted to the trunnion 32) forwardly and upwardly to a stowed position within the fuselage 12. This stowed position of the assembly 20 is shown in broken lines at 22' in FIG. 5 with the shock strut 26 in its stowed position being shown at 26'.

The drag brace 36 is connected to the shock strut 26 through a fuse pin 48, which is designed to give way or release when a tension load above a predetermined level is applied to the drag brace 36. Thus, in the arrangement of the prior art components described thus far in a situation where the wheels 22 of the landing gear assembly 20 encounter some unusual obstacle on the runway which applies an excessive rearward force on the wheels 20, the fuse pin 48 is designed to give way and permit the wheels 22, shock strut 26 and the components immediately attached thereto to break away from the drag brace 36 and continue to rotate upwardly and rearwardly about the axis of the trunnion 32.

Figure 6:
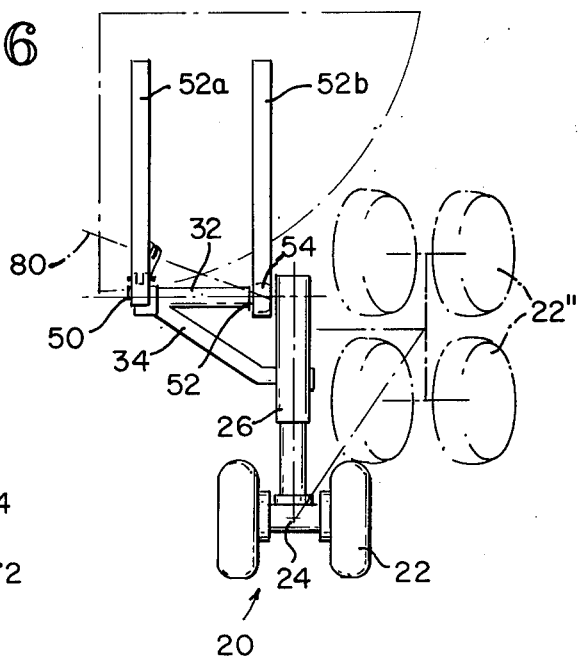
FIG. 6 is a front elevational view of the assembly shown in FIGS. 2 and 5, with the landing gear assembly being shown in broken lines in its overload release position.

It is to be kept in mind that the components 10 through 48 which have been described thus far existed in the prior art before the present invention. The present invention was conceived with the particular purpose in mind of accomplishing the better deployment of a landing gear assembly, such as that shown at 20, under overload release conditions. In the prior art, both ends of the trunnion 32 are mounted to fixed fuselage structure so that when the fuse pin 48 of the drag brace 36 gives way, the wheels 22 and their associated components continue to rotate rearwardly and upwardly about the axis of the trunnion 32, which would result in the wheels 22 pushing into the bottom side of the fuselage 12 at a location rearwardly of the trunnion 32. In accordance with the present invention, this condition is alleviated by mounting the trunnion 32 to an intermediate mounting structure, which in turn is mounted to the fuselage 12 for rotation about a secondary axis offset with respect to the trunnion axis. This permits the wheels 22 and their associated components to move to a third overload release position away from the fuselage 12, this being shown in broken lines in FIGS. 5 and 6, where the wheels 22 in this overload release position are designated 22".

To describe the present invention more specifically, the laterally inward end 49 of the trunnion 32 is mounted for rotation about a transverse horizontal axis to an intermediate mounting member 50 which is in turn mounted to the lower end of a first trunnion mounting post 52a which is part of the fixed structure of the aircraft fuselage 12. This mounting member 50 has a first overload release connection to the mounting post 52, this being shown in FIG. 3 in the form of a pair of upstanding ears 54 which define therebetween a longitudinally aligned recess 56 to receive a tongue member 58 which protrudes downwardly from the lower end of the trunnion mounting post 52a. The ears 54 and tongue member 58 are provided with aligned transverse horizontal through holes in which is positioned a fuse pin 60 which is designed to release or give way when a lateral force thereon exceeds a predetermined limit. It is to be understood that this fuse pin 60 is shown only semi-schematically, and that the term "fuse pin" is used in its broader sense to indicate a release mechanism which goes into its release mode when a load above a certain level is exerted thereon.

A stop member 62 is rigidly connected to the outside face 64 of the mounting member 50 at a location behind and below the inner end 48 of the trunnion 32. This stop member 62 is shown in FIG. 4, and it can be seen to have a forwardly directed abutment face 66 which is positioned closely adjacent to and directly behind a boss member 68 rigidly connected to the lower part of the inside end 49 of the trunnion 32. This boss member 68 serves a dual function. First, it provides a connecting point for the inside edge of the side brace 34. Secondly, the boss serves an additional function of providing a rearwardly facing abutment face 70 which is closely adjacent to the abutment face 66 of the stop member 62 when the wheels 22 are in their full down position, so as to prevent any further rearward rotation of the trunnion member 32 about its axis of rotation.

To explain this more fully, when the wheels 22 are moved between their upward and forward stowed position (at 22' in FIG. 5) and the down position (shown in full lines at 22 in FIG. 5), such rotation takes place along the axis of the trunnion 32. However, in the event that there is a release of the fuse pin 48, which connects the drag strut 36 to the shock strut 26, the wheels 22 will tend to rotate rearwardly from their down position, and the two abutment faces 66 and 70 of, respectively, the stop member 62 and the boss 68 will engage each other and resist further rotation of the wheels 22 about the axis of the trunnion 32. The significance of this will become more apparent in the subsequent description of the operation of the present invention.

Figure 7:
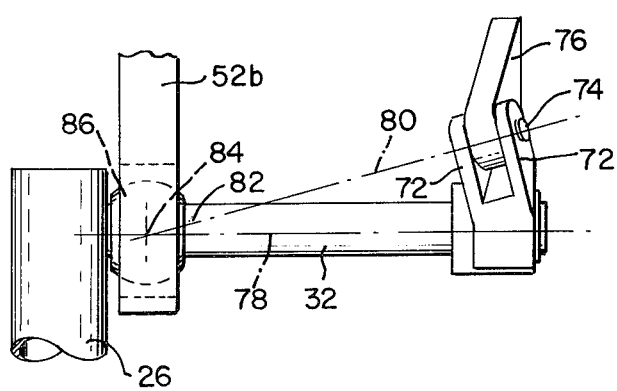
FIG. 7 is a rear view of the trunnion mounting of the landing gear assembly.

The intermediate mounting member 50 has a second pivot connection to the trunnion post 52a, this being provided by a pair of rearwardly and upwardly extending arms 72, pivotally connected to an arm 76 which is rigidly connected to the trunnion mounting post 52a. With reference to FIG. 7 particularly, it will be noted that the pivot connection 74 is located above and moderately to the rear of the primary trunnion axis 78 (i.e., the axis about which the trunnion 32 normally rotates). Further, it will be noted that the arms 72 are "skewed" moderately and slanted moderately off the vertical so that the axis of rotation of the pivot connection 74 (this axis being indicated at 80 in FIG. 7) intersects the primary trunnion axis 78 at a location where the trunnion 32 is mounted to a second trunnion post 52b (which also is part of the permanent structure of the aircraft fuselage 12) at the outboard end 82 of the trunnion 32. This point of intersection of the two axes 78 and 80 is indicated at 84 in FIG. 7.

With further reference to FIG. 7, it will be noted that the outer end 82 of the trunnion 32 is mounted to the outboard trunnion post 52b by means of a ball joint 86 mounted for rotational or pivotal movement about the point 84 which is the intersection of the two axes 78 and 80. Thus, the outer end 82 of the trunnion is able to rotate about both the primary trunnion axis 78 and the axis 80, which is the overload release axis.

To describe the operation of the present invention, under normal circumstances, the landing gear apparatus will function in the same manner as the prior art landing gear described previously herein. In other words, retraction of the actuator 47 moves the wheels 22 upwardly and forwardly to the stowed position shown at 22' in FIG. 5. For landing of the aircraft, the wheels 22 are moved downwardly and rearwardly to the full down position shown in full lines at 22 in FIG. 5.

However, let it be assumed that upon landing of the aircraft 10, the wheels 22 encounter some obstacle on the runway which exerts a force on the wheels 22 of such a magnitude that a tension load is placed on the drag strut 36 above the level at which the fuse pin 48 is designed to give way. As the fuse pin 48 gives way so that the wheels 22 and their associated components are no longer restrained by the drag strut 36 from further rearward movement, the wheels 22 begin to move rearwardly about the primary trunnion axis 78. However, after very slight rearward movement, the two abutment faces 66 and 70 of, respectively, the stop member 62 and the boss 68 engage each other at the inner end 49 of the trunnion 32. This causes a force to be exerted on the fuse pin 60 which connects the intermediate mounting member 50 to the inner trunnion post 52a, to cause this fuse pin 60 to release. This permits the entire landing gear assembly 20 to rotate about the secondary overload release axis 80, along with the intermediate mounting member 50. Since the secondary axis 80 is "skewed," or "offset" with respect to the primary axis 78 in a direction (taken from an inboard location to an outboard location) which is downwardly and forwardly, the landing gear wheels 22, along with their associated components, rotate in an upward and outward direction rearwardly, which places the wheels 22 in their associated components in an overload release position at 22" which is clear of the fuselage 12 of the airplane 10. This can best be seen with reference to FIGS. 5 and 6.

What is claimed:

1. In an aircraft base structure, having a movable landing gear member, said movable landing gear member being mounted for movement on a first axis between a first and second position,
    an improvement to provide for proper deployment of said movable landing gear member to a third position under condition of excessive loading which tends to move the landing gear member beyond its second position, said improvement comprising:
    a. an intermediate mounting member to which said movable landing gear member is mounted for movement on said first axis between its first and second positions,
    b. stop means operatively positioned between the intermediate member and the movable landing gear member to limit movement thereof relative to the intermediate member beyond said second position,
    c. said intermediate member being mounted to said base structure for movement on a second axis offset relative to said first axis,
    d. a yielding connecting member interconnecting the intermediate mounting member and the aircraft base structure, and arranged to resist movement of said intermediate member on said second axis with a resisting force less than a force exerted thereon as a result of excessive loading on said movable landing gear member, and to release upon such excessive loading,
    e. said movable landing gear member having a first end and a second end, said first end being mounted to said intermediate member for rotation about said first axis, said second end being mounted to said base structure for rotation about said first axis, and said intermediate member being in turn mounted to said base structure for rotation about said second axis which is skewed with respect to said first axis, and
    f. the second end of the movable member being connected to the base structure for rotation about both of said first and second axes,
    whereby under conditions of excessive loading on said movable landing gear member, said stop means resists further movement of said movable landing gear member on said first axis, so that upon release of the yielding connecting member the movable landing gear member and the intermediate mounting member move together on said second axis to said third position.

2. The improvement as recited in claim 1, wherein the second end of the movable member is connected to the base structure about a ball joint type connection, which is mounted for rotation about a point generally coinciding with a point where said first and second axes of rotation intersect.

3. In an aircraft base structure, having a movable landing gear member, said movable landing gear member being mounted for movement on a first axis between a first and second position,
    an improvement to provide for proper deployment of said movable landing gear member to a third position under condition of excessive loading which tends to move the landing gear member beyond its second position, said improvement comprising:
    a. an intermediate mounting member to which said movable landing gear member is mounted for movement on said first axis between its first and second positions,
    b. stop means operatively positioned between the intermediate member and the movable landing gear member to limit movement thereof relative to the intermediate member beyond said second position,
    c. said intermediate member being mounted to said base structure for movement on a second axis offset relative to said first axis,
    d. a yielding connecting member interconnecting the intermediate mounting member and the aircraft base structure, and arranged to resist movement of said intermediate member on said second axis with a resisting force less than a force exerted thereon as a result of excessive loading on said movable landing gear member, and to release upon such excessive loading, e. said movable member having a first end and a second end, said first end being connected to the intermediate mounting member for rotation about said first axis, said intermediate mounting member being mounted to said base structure for rotation about said second axis, which is skewed with respect to said first axis, the second end of the movable member being connected to the base structure for rotation about both said first and second axes, at a location generally coinciding with the intersection of said first and second axes, whereby under conditions of excessive loading on said movable landing gear member, said stop means resists further movement of said movable landing gear member on said first axis, so that upon release of the yielding connecting member the movable landing gear member and the intermediate mounting member move together on said second axis to said third position.

4. The improvement as recited in claim 3, wherein there is a ball joint connection by which said second end of the movable member is connected to the base structure, said ball joint connection being mounted for rotation about said location generally coinciding with the intersection of said first and second axes.

5. An overload release apparatus comprising:
a. an aircraft base structure,
b. a movable landing gear member being mounted for movement on a first axis between a first and second position,
c. an intermediate mounting member to which said movable member is mounted for movement on said first axis between its first and second positions,
d. stop means operatively positioned between the intermediate member and the movable member to limit movement thereof relative to the intermediate member beyond said second position,
e. said intermediate member being mounted to said base structure for movement on a second axis offset relative to said first axis,
f. a yielding connecting member interconnecting the intermediate member and the base structure, and arranged to resist movement of said intermediate member on said second axis with a resisting force less than the force exerted thereon as a result of excessive loading on said movable member, and to release upon such excessive loading,
g. said movable member having a first end and a second end, said first end being mounted to said intermediate member for rotation about said first axis, said second end being mounted to said base structure for rotation about said first axis, and said intermediate member is in turn mounted to said base structure for rotation about said second axis which is skewed with respect to said first axis, and
h. the second end of the movable member being connected to the base structure for rotation about both of said first and second axes, whereby under conditions of excessive loading of said movable member, said stop means resists further movement of said movable member on said first axis, so that upon release of the yielding connecting member, the movable member and the intermediate member move together on said second axis to a third position.

6. The improvement as recited in claim 5, wherein the second end of the movable member is connected to the base structure about a ball joint type connection, which is mounted for rotation about a point generally coinciding with a point where said first and second axes of rotation intersect.

7. An overload release apparatus comprising:
a. an aircraft base structure,
b. a movable landing gear member being mounted for movement on a first axis between a first and second position,
c. an intermediate mounting member to which said movable member is mounted for movement on said first axis between its first and second positions,
d. stop means operatively positioned between the intermediate member and the movable member to limit movement thereof relative to the intermediate member beyond said second position,
e. said intermediate member being mounted to said base structure for movement on a second axis offset relative to said first axis,
f. a yielding connecting member interconnecting the intermediate member and the base structure, and arranged to resist movement of said intermediate member on said second axis with a resisting force less than the force exerted thereon as a result of excessive loading on said movable member, and to release upon such excessive loading,
g. said movable member having a first end and a second end, said first end being connected to the intermediate mounting member for rotation about said first axis, said intermediate mounting member being mounted to said base structure for rotation about said second axis, which is skewed with respect to said first axis, the second end of the movable member being connected to the base structure for rotation about both said first and second axes, at a location generally coinciding with the intersection of said first and second axes, whereby under conditions of excessive loading of said movable member, said stop means resists further movement of said movable member on said first axis, so that upon release of the yielding connecting member, the movable member and the intermediate member move together on said second axis to a third position.

8. The improvement as recited in claim 1, wherein there is a ball joint connection by which said second end of the movable member is connected to the base structure, said ball joint connection being mounted for rotation about the location generally coinciding with the intersection of said first and second axes.

9. In an aircraft having a fuselage base support structure, and a landing gear mounted to said base structure for movement on a first axis between a first stowed position and a second down position, an improvement to provide for proper deployment of said landing gear to a third overload position under condition of excessive loading which tends to move the landing gear beyond its second down position, said improvement comprising:
a. an intermediate mounting member to which said landing gear is mounted for movement on said first axis between its first and second positions,
b. stop means operatively positioned between the intermediate member and the landing gear to limit movement thereof relative to the intermediate member beyond said second position,
c. said intermediate member being mounted to said base structure for movement on a second axis offset relative to said first axis,
d. a yielding connecting member interconnecting the intermediate member and the base structure, and arranged to resist movement of said intermediate member on said second axis with a resisting force less than a force exerted thereon as a result of excessive loading on the landing gear, and to release upon such excessive loading, e. said landing gear having trunnion means with a first end and a second end, said first end being mounted to said intermediate member for rotation about said first axis, said second end being mounted to said base structure for rotation about said first axis, and said intermediate member being in turn mounted to said base structure for rotation about said second axis which is skewed with respect to said first axis, and f. the second end of the trunion means being connected to the base structure for rotation about both of said first and second axes, whereby under conditions of excessive loading on the landing gear, said stop means resists further movement of said landing gear on said first axis, so that upon release of the yielding connecting member the landing gear and the intermediate member move together on said second axis to said third position.

10. The improvement as recited in claim 9, wherein the second end of the trunnion means is connected to the base structure about a ball joint type connection, which is mounted for rotation about a point generally coinciding with a point where said first and second axes of rotation intersect.

11. In an aircraft having a fuselage base support structure, and a landing gear mounted to said base structure for movement on a first axis between a first stowed position and a second down position, an improvement to provide for proper deployment of said landing gear to a third overload position under condition of excessive loading which tends to move the landing gear beyond its second down position, said improvement comprising:

a. an intermediate mounting member to which said landing gear is mounted for movement on said first axis between its first and second positions, b. stop means operatively positioned between the intermediate member and the landing gear to limit movement thereof relative to the intermediate member beyond said second position, c. said intermediate member being mounted to said base structure for movement on a second axis offset relative to said first axis, d. a yielding connecting member interconnecting the intermediate member and the base structure, and arranged to resist movement of said intermediate member on said second axis with a resisting force less than a force exerted thereon as a result of excessive loading on the landing gear, and to release upon such excessive loading, e. said landing gear having a trunnion means with a first end and a second end, said first end being connected to the intermediate mounting member for rotation about said first axis, said intermediate mounting member being mounted to to said base structure for rotation about said second axis, which is skewed with respect to said first axis, the second end of the trunnion means being connected to the base structure for rotation about both said first and second axes, at a location generally coinciding with the intersection of said first and second axes, whereby under conditions of excessive loading on the landing gear, said stop means resists further movement of said landing gear on said first axis, so that upon release of the yielding connecting member the landing gear and the intermediate member move together on said second axis to said third position.

12. The improvement as recited in claim 11, wherein there is a ball joint connection by which said second end of the trunnion means is connected to the base structure, said ball joint connection being mounted for rotation about the location generally coinciding with the intersection of said first and second axes.

13. The improvement as recited in claim 11, wherein said trunnion means is mounted for rotation about a transverse horizontal axis which is said first axis, in a manner that said landing gear swings from it second down position upwardly and forwardly to its stowed position, and said second axis is skewed with respect to the first axis so that said landing gear moves to its overload position not only upwardly and rearwardly, but also laterally.

14. The improvement as recited in claim 11, wherein said landing gear is mounted to the fuselage of the aircraft, and is stowed by movement upwardly and forwardly in the aircraft fuselage, and said second axis is skewed in a direction that said landing gear, in moving to its third overload condition, moves not only upwardly and rearwardly, but also laterally to a location away from the fuselage.

15. The improvement as recited in claim 14, wherein said second axis is skewed upwardly from the first axis, so that said second overload axis slants downwardly and through said first axis.

16. The improvement as recited in claim 14, wherein said second axis is skewed rearwardly with respect to said first axis, so that said second axis slants in a forward direction to intersect said first axis.

17. The improvement as recited in claim 14, wherein said second axis is skewed both upwardly and rearwardly with respect to said first axis, so that said second axis slants downwardly and forwardly to intersect said first axis.

18. The improvement as recited in claim 13, wherein said intermediate member has a first trunnion mounting portion which is releasably connected to the aircraft base structure, and second arm means extending from the first portion to pivotally connect to said base structure, said arm means having a pivot connection to the base structure skewed with respect to the first axis.

19. In an airplane having an aircraft base structure having a longitudinal axis, a transverse axis and a vertical axis, a landing gear assembly capable of providing for proper deployment thereof under conditions of excessive loading, said assembly comprising:

a. a main landing gear member operatively mounted in the airplane for rotation about a generally transversely and horizontally aligned first operating axis between an upper forward stowed position and a rear downwardly extending deployed position, in a manner that said main landing gear member is swung upwardly and forwardly to said stowed position and swung downwardly and rearwardly to said deployed position, b. a stop means arranged to prevent rearward rotation of said landing gear member about said first operating axis beyond a location rearwardly of said deployed position, c. an intermediate mounting member which is mounted to said base structure and to which said main landing gear member is mounted for rotation about a second release axis, which is skewed with respect to said first axis, for rotation of said main landing gear member from said deployed position rearwardly, laterally and upwardly to an overload release position, and d. a yielding connecting member arranged to resist said rotation of said main landing gear member about said second release axis with a resisting force less than a force exerted against said yielding connecting member resulting from said excessive loading, whereby under conditions of excessive loading on the landing gear member, said stop means resists further movement of said landing gear member on said first axis, so that upon release of the yielding connecting member the landing gear member moves on said second axis to said overload release position.

20. The landing gear assembly as recited in claim 19, wherein said landing gear member is mounted to the intermediate mounting member for rotation about said first axis relative to said intermediate mounting member, and said intermediate mounting member has a pivot connection to said base structure for rotation about said second axis, so that upon release of the yielding connecting member, the landing gear member and the intermediate mounting member move together on said second axis to said overload release position.

21. The assembly as recited in claim 20, wherein said yielding member interconnects said intermediate mounting member to said base structure at a location spaced from the pivot connection of the intermediate mounting member to the base structure.

22. The assembly as recited in claim 19, wherein said landing gear member has trunnion means with a first end and a second end, said first end being mounted to said intermediate member for rotation about said first axis, said second end being mounted to said base structure for rotation about said first axis, and said intermediate mounting member being in turn mounted to said base structure for rotation about said second axis.

23. In an aircraft having a fuselage base support structure, a. a landing gear apparatus comprising two landing gear assemblies mounted to said fuselage base support structure in side by side relationship, each of said landing gear assemblies comprising:

1. a landing gear mounted for movement on a first transverse horizontal axis between a first stowed position and a second down position in a manner that said landing gear swings from its second down position upwardly and forwardly to its stowed position, 2. an intermediate mounting member to which said landing gear is mounted for movement on said first axis between its first and second positions, 3. stop means operatively positioned between the intermediate member and the landing gear to limit movement thereof relative to the intermediate member beyond said second position, 4. said intermediate member being mounted to said base structure for movement on a second axis offset relative to said first axis, 5. a yielding connecting member interconnecting the intermediate member and the base structure, and arranged to resist movement of said intermediate member on said second axis with a resisting force less than a force exerted thereon as a result of excessive loading on the landing gear, and to release upon such excessive loading, 6. said landing gear having a trunnion means with a first end and a second end, said first end being connected to the intermediate mounting member for rotation about said first axis, said intermediate mounting member being mounted to said base structure for rotation about said second axis, which is skewed with respect to said first axis, the second end of the trunnion means being connected to the base structure for rotation about both said first and second axes, at a location generally coinciding with the intersection of said first and second axes, whereby under conditions of excessive loading on the landing gear, said stop means resists further movement of said landing gear on said first axis, so that upon release of the yielding connecting member the landing gear and the intermediate member move together on said second axis to a third position, b. said apparatus being further characterized in that the second axis of each landing gear assembly is skewed with respect to the first axis so that each landing gear moves to said third position not only upwardly and rearwardly, but also laterally, with the second axes of the two landing gear assemblies being skewed oppositely to one another, so that upon overload release condition of the two landing gear, the two landing gear would be deployed on opposite sides of the fuselage base support structure.

* * * * *